B. SCHECHTER.
SEAT.
APPLICATION FILED APR. 19, 1916.
1,231,205.
Patented June 26, 1917.
2 SHEETS—SHEET 1.
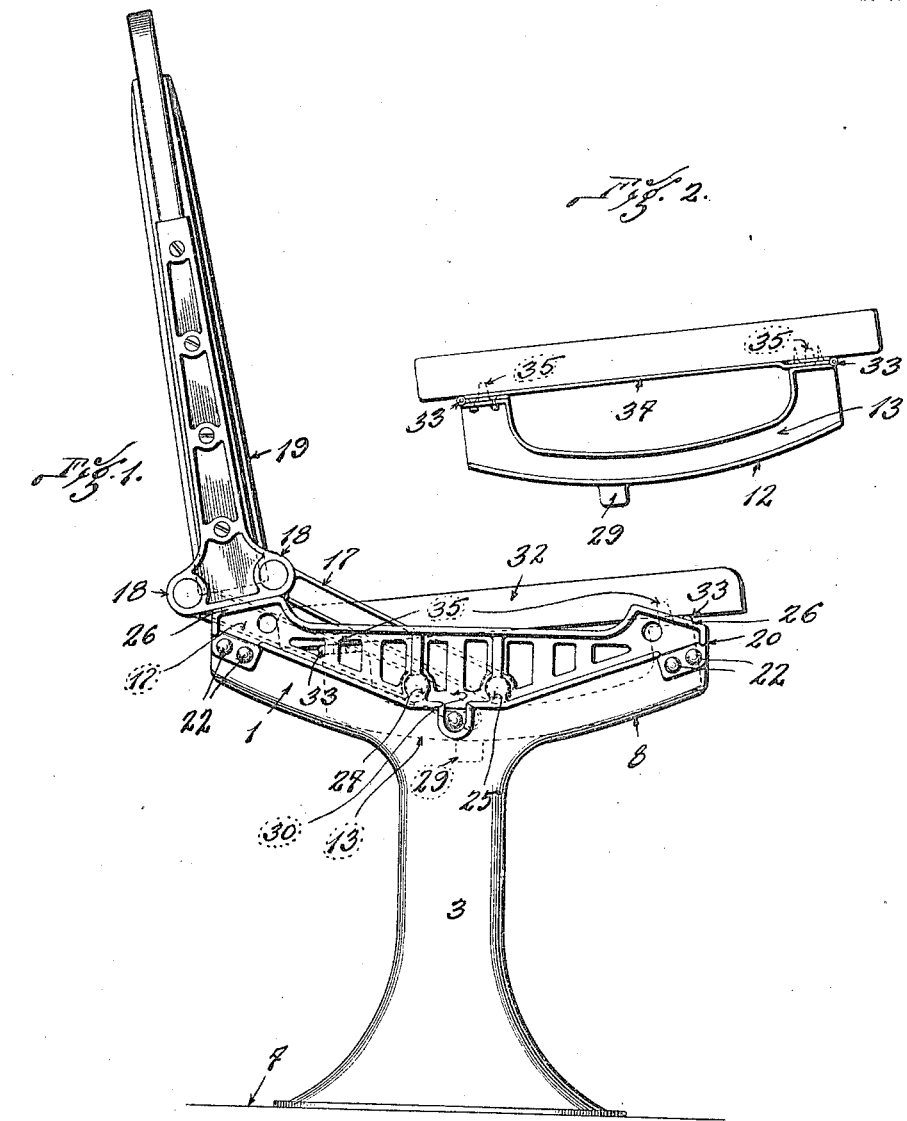
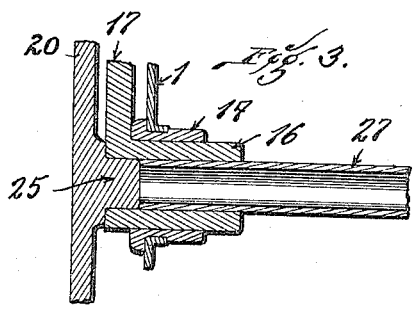
Inventor:—
Bernard Schechter,
By Hugh N. Wagner, attorney.

B. SCHECHTER.
SEAT.
APPLICATION FILED APR. 19, 1916.
1,231,205.
Patented June 26, 1917.
2 SHEETS—SHEET 2.
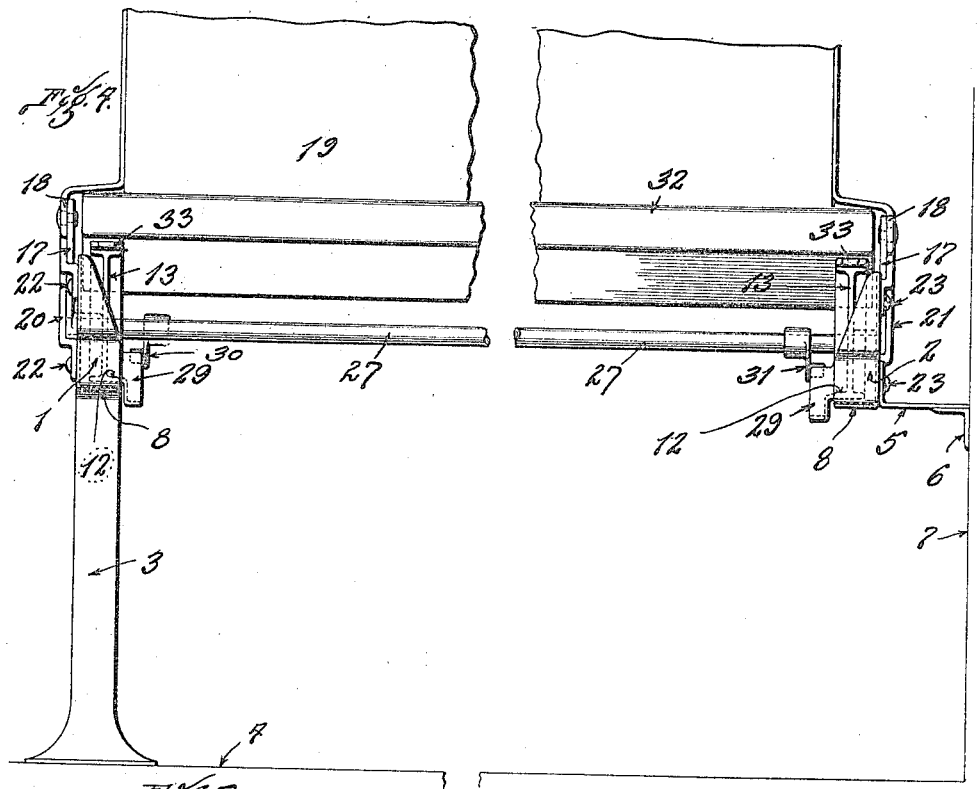
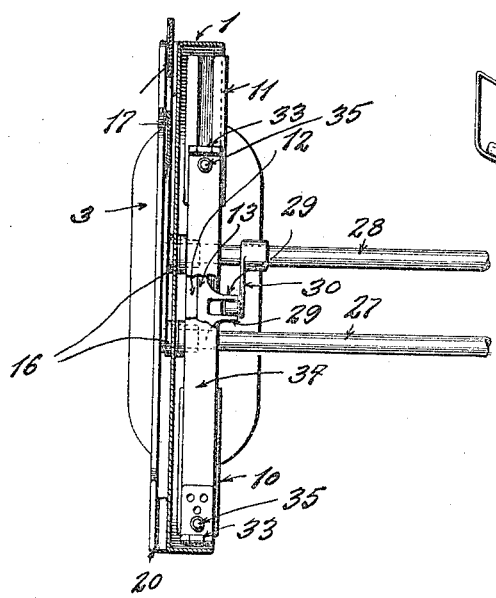
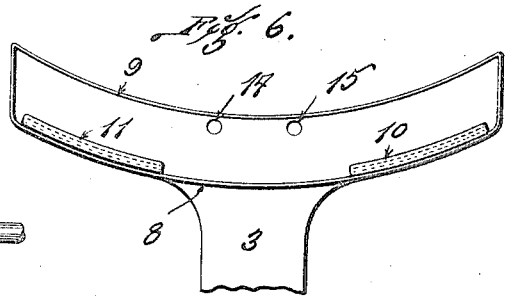
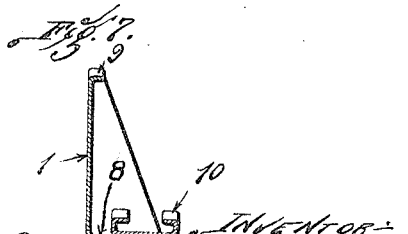
INVENTOR:
Bernard Schechter,
By Hugh K. Wagner
ATTORNEY.

UNITED STATES PATENT OFFICE.

BERNARD SCHECHTER, OF ST. LOUIS, MISSOURI, ASSIGNOR OF ONE-THIRD TO GEORGE H. TONTRUP AND ONE-THIRD TO WILLIAM J. MACKLE, BOTH OF ST. LOUIS, MISSOURI.

SEAT.

1,231,205.  Specification of Letters Patent.  Patented June 26, 1917.

Application filed April 19, 1916. Serial No. 92,099.

*To all whom it may concern:*

Be it known that I, BERNARD SCHECHTER, a citizen of the United States, residing at the city of St. Louis, in the State of Missouri, have invented certain new and useful Improvements in Seats, of which the following is a specification.

This invention relates to seats adapted to be used on railway cars, omnibuses, coaches, other vehicles and the like, and wherever seats are arranged adjacent an aisle or the like.

It has for its object to provide an adjustable seat of simple and strong construction consisting of few parts and having a back adapted to be shifted conveniently to a position adjacent either of the opposite edges of the seat-bottom or cushion, said shifting of the back causing the seat-bottom to be adjusted forwardly and to a convenient angle from the horizontal in a position comfortable for the occupant of the seat.

Another object is to provide a seat of relatively cheap construction and of light weight that will be firm and rigid when in an adjusted position suitable for seating an occupant comfortably thereon.

Another object is to provide an adjustable seat having its seat-bottom or cushion in hinged association with adjacent parts of the structure so that said seat-bottom may be lifted readily on either of its opposite side edges and folded up toward the seat-back and may, also, be dropped down readily from folded to normal position.

Another object is to provide a seat, having a shiftable back and a coöperatively adjustable seat-bottom, in which the framing rails adjacent the front and rear edges of the seat-bottom may be omitted.

Some of the advantages of the seat embodying the present invention are economy in the use of material in construction, the facility with which the movable parts may be adjusted to a desired position, the coöperation of parts whereby the shifting of the seat-back simultaneously adjusts the seat-bottom to a position comfortable for the occupant, and the firmness and rigidity of the seat when adjusted to a position adapted for seating occupants thereon.

Another advantage is that the seat of this invention consists of few parts and is sanitary, the construction being such that there is the least possible obstruction adjacent the floor or the like between the pedestal adjacent the aisle and the wall, thus facilitating the sweeping and cleaning of a car or the like equipped with seats embodying this invention.

Another advantage is that in a seat embodying the present invention and adapted for seating two or more persons thereon, as, for instance, in a railway car, the hinged association of the seat-bottom with adjacent parts and the absence of obstructing framing rails adjacent the front and rear edges of said seat-bottom enables the passenger seated nearest the aisle to arise and step rearwardly without going out into the aisle, when the hinged seat-bottom has been lifted up and folded back, thus allowing a companion passenger or passengers to pass freely out into the aisle from the part of the seat adjacent the wall or to pass freely from the aisle to a seat-place adjacent the wall and thus avoiding confusion and crowding of the aisles with persons who do not desire to leave the car or enter through an aisle to a seat-place.

Furthermore, this invention consists in the construction, arrangement, and combination of parts hereinafter more particularly described and set forth in the claims.

In the accompanying drawings, forming part of this specification, wherein like numbers of reference denote like parts wherever they occur, Figure 1 is an end elevation of a seat embodying the present invention looking at the device from the aisle of a car or the like;

Fig. 2 is a detail of a part of Fig. 1, showing an end elevation of the seat-bottom, a rocker adjacent one end of said seat-bottom, and the manner of associating said parts in hinged relation with each other;

Fig. 3 is a fragmentary sectional view, on an enlarged scale, showing details of construction of parts of Fig. 1, the parts illustrated being one end of one of the rocker shafts and the parts adjacent thereto;

Fig. 4 is a front elevation of the seat with a portion thereof intermediate the two sides and a portion adjacent the top of the seat-back broken away;

Fig. 5 is a fragmentary view, partly in plan and partly in horizontal section, looking down upon parts of the seat adjacent the aisle pedestal below the seat-bottom, a central portion of the hinge-strap of the seat-bottom hinge having been broken away to disclose parts below same;

Fig. 6 is a plan view showing details of construction of the inner plate of the seat-frame and the rocker guides borne by said plate, a portion of the seat-pedestal associated with said plate being broken away; and Fig. 7 is a cross-sectional view of Fig. 6, on an enlarged scale, on a line through one of rocker-guides.

A pair of opposite inner end-plates 1 and 2 may be provided and plate 1 may be secured to pedestal 3 in any suitable manner or may be made integrally with said pedestal, said pedestal being mounted on floor 4 of the car or the like, and the other plate 2 may be borne by angle-bracket 5, one end of said angle-bracket being secured to plate 2 in any suitable manner and the other end of said angle-bracket being borne by a second angle-bracket 6, which last-named angle-bracket may be secured to the adjacent side-wall 7 or the like of said car or the like, said pair of plates 1 and 2 being mounted, one on said pedestal and the other adjacent said side-wall, in alinement with each other at substantially similar heights above floor 4.

The lower edges of plates 1 and 2 may each bear an inwardly turned flange 8, said flange and, also, said edges being curved longitudinally in substantially an arc of a radius suitable for the purposes of this invention.

Plates 1 and 2 may be provided, also, with a flanged upper edge 9 and said edge may be curved longitudinally correspondingly to the curve of flange 8, as best seen in Fig. 6.

A pair of members 10 and 11, adapted as longitudinally slotted guides, may be borne in spaced relation to each other by the upper surface of each flange 8, a guide extending from each end of each one of the plates 1 and 2 toward but not to the center intermediate the ends of said plate, there being a gap between members 10 and 11, as best seen in Fig. 6.

Each pair of members 10 and 11 are adapted, also, as longitudinal bearings for the flanged base-edge 12 of one of a pair of shifting rockers 13 slidably mounted on said members adjacent flange 8, the slot of said members being as guides for said rockers slidably mounted in said members, the construction and arrangement of parts, as described and as shown in the drawings, being such as to afford the great advantage of providing substantial bearings for the end-portions of rockers 13, mounted in said members, in all adjusted positions of said shifting rockers in operating the seat of this invention, as hereinafter more particularly described, it being, of course, understood that, if desired, members 10 and 11 may be extended longitudinally to form substantially continuous guides and bearings along the entire length of flanges 8, and, it being further understood, that, if desired, members 10 and 11 may be formed integrally with said flanges.

Each plate 1 and 2 may be provided with a pair of turned bushings 14 and 15, said bushings being riveted or otherwise secured in place in said plates and being adapted as bearings for an adjacent hollow hub 16 pivotally mounted therein, there being a hub 16 borne by one end of each one of two pairs of seat-back levers 17, there being one pair of said seat-back levers mounted adjacent plate 1 and another pair of said seat-back levers mounted adjacent plate 2, the other ends of said seat-back levers being pivotally attached to appropriate bearings 18 therefor borne by seat-back 19.

A pair of outer end-plates 20 and 21 may be provided, plate 20 being bolted by means of bolts 22 or the like or otherwise secured to plate 1 in spaced relation therewith and plates 21 and 2 being bolted together in spaced relation by means of bolts 23 or otherwise attached together. A pair of lug-bearings 24 and 25 are borne by each outer end-plate 20 and 21 each of said lug-bearings being adapted to provide a second bearing for an adjacent hollow hub 16, so that one pair of seat-back levers 17 is mounted between inner end-plate 1 and outer end-plate 20 with the hubs 16 of said levers mounted in two bearings, a lug-bearing and a bushing, and the other pair of seat-back levers 17 is mounted between inner end-plate 2 and outer end-plate 21 with the hubs 16 of said other pair of levers mounted in two bearings, a lug-bearing and a bushing, the space between plates 1 and 20 and between plates 2 and 21 forming a guide or path of travel for the pairs of seat-back levers, respectively mounted therein, there being a stop 26 formed adjacent each end of each outer end-plate 20 and 21, said stop being adapted to limit the movement of seat-back 19 when said seat-back is shifted by the operation of said levers, as hereinafter described.

A pair of shafts 27 and 28 are mounted between plates 1 and 2, each shaft having its opposite ends rigidly mounted in opposite hubs 16, so that said shafts will be rocked as levers 17 are swung to rock said hubs in their bearings. The construction of parts is such that said shafts form ties between plates 1 and 20 adjacent one of the ends of said shafts and plates 2 and 21 adjacent their opposite ends, thus permitting the omission of framing rails usually used for tying opposite end portions of seat-frames together, and, moreover, the shafts 27 and 28 being located well inwardly of the front and rear ends of plates 1, 2, 20, and 21 and adjacent their middle portions they do not form obstructions adjacent said front and rear ends when the device is operated as hereinafter described.

Each rocker 13 is provided with an inwardly projecting member 29, which may be substantially U-shaped and bears a U-shaped slot, as best seen in Figs. 4 and 5, said members being out of center with reference to the two ends of said rockers.

A pair of levers 30 and 31 may be provided, lever 30 being rigidly secured at one end to shaft 28 and having its other end adapted to engage slidably in the slot of one of the members 29 and lever 31 being rigidly secured at one end to shaft 27 and having its other end adapted to engage slidably in the slot of the other member 29, the construction and arrangement of parts being such that the rocking of shaft 28 will actuate lever 30 to shift one of the rockers 13 correspondingly along in its guides 10 and 11 and the rocking of shaft 27 will actuate lever 31 to shift the other rocker 13 along correspondingly in its guides 10 and 11, said levers with their ends in engagement with members 29 being adapted to hold said rockers in a shifted position with one side-edge of seat-bottom 32 elevated slightly above the level of the opposite side-edge of said seat-bottom, as best seen in Fig. 1, said seat bottom being mounted on said rockers in hinged relation therewith, the hinged attachment adjacent each rocker being depicted in Fig. 2 and consisting of a double hinge 33 having one end secured to one end of a rocker 13 and having its other end secured to the underside of said seat-bottom adjacent the other end of said rocker, said two ends of said hinge being connected by elongated hinge-strap 34, adapted to extend from one end of said rocker to the other, there being a projecting lug or pin 35 borne by each end of rockers 13, said pins being adapted to extend upwardly through appropriate holes therefor in said hinges and being adapted to seat or enter appropriate pits therefor borne by the underside of said seat-bottom, the construction and arrangement of the parts being such that said seat-bottom may be folded up from either side-edge on the hinge adjacent the opposite side-edge and swung back toward seat-back 19, the purpose of pins 35 being so that said seat-bottom will readily drop into its proper place when same is let down from folded to normal position.

Any suitable material may be used in the construction of the seat and its parts embodying the present invention, but for the purpose of making the structure relatively light in weight and still of sufficient strength and, furthermore, for the purpose of convenience and economy in manufacture, plates 1, 2, 20, and 21, rockers 13, and other parts may be made of pressed steel or other suitable metal.

In operating the seat embodying the present invention, the movement of shifting the seat-back 19 from one side-edge of seat-bottom 32 toward and to the opposite side-edge of said seat-bottom throws levers 17 causing lever-hubs 16 to rock shafts 27 and 28, and the rocking of said shafts actuates levers 30 and 31 to push rockers 13 slidably along their guides 10 and 11 in a general direction opposite to that of the shifting movement of the seat-back and, when stops 26 at one end of plates 20 and 21 impinge upon an adjacent portion of said seat-back and limit the further movement of said seat-back in that direction, the sliding of rockers 13 in their guides will have shifted seat-bottom 32 forwardly and tilted its forward edge upwardly slightly above the level of its rearward edge, as shown in the drawings, in which position said seat-bottom affords a comfortable rest for the occupant of the seat.

The advantages of a seat provided with a reversible back adapted to be shifted back and forth, as described, is well-known and provides a seat whereon passengers in a vehicle or the like may sit facing toward or away from the direction of the movement of the vehicle and still have a comfortable seat-back against which to rest their backs.

By means of the hinges 33, seat-bottom 32 may be raised up from either side-edge and folded back on the opposite side-edge toward seat-back 19, thus permitting anyone occupying a seat-place adjacent the aisle at pedestal 3 to arise a step back in his place to give free passage to another or others to and from the aisle to seat-places adjacent wall 7, shafts 27 and 28 being well inwardly of the normal position of the side-edges of the seat-bottom and, there being no framing rails or other obstructions traversing the spaces between the ends of plates 1 and 20 across to the ends of plates 2 and 21, an abundance of room is provided for the occupant of the seat-place adjacent the aisle to step back in his place when said seat-bottom is folded back as described.

Many changes in the details of construction and in the arrangement and combination of the parts of the seat herein described may be made without departing from the nature and spirit of the present invention.

I claim:

1. A seat-frame comprising opposite sets of plates adjacent opposite ends of the frame, each set consisting of two adjacent plates attached together in spaced relation to each other, levers operatively mounted between said adjacent plates, said levers being adapted as seat-back throwing levers, and means adapted as a double bearing for pivotally mounting one end of each of said levers between said adjacent plates, said means including a bushing for each lever end borne by one of the adjacent plates and an inwardly projecting member borne by the other adjacent plate opposite each bushing.

2. A seat-frame comprising opposite sets of plates mounted at opposite ends of the frame, each set consisting of an inner and an adjacent outer plate attached together in spaced relation to each other, levers operatively mounted between the plates of each set and having their paths of travel along the space between said plates, and two bearings adapted for pivotally mounting one end of each of said levers between said plates, one of said bearings consisting of a bushing being borne by the inner plate and the other consisting of a bushing being borne by the adjacent lever end and extending within the first mentioned bushing, and lugs carried by each of said outer plates and adapted to engage within the outer end of said last named bushing to form a support therefor, said levers being adapted as seat-back throwing levers.

3. A seat-frame comprising opposite sets of plates mounted at opposite ends of the frame, each set consisting of two adjacent plates attached together in spaced relation to each other, levers operatively mounted between the plates of each set, the space between said plates being adapted to form the path of travel of said levers, said levers being adapted as seat-back throwing levers, and means adapted as double bearings for pivotally mounting one end of each of said levers between said plates, said means consisting of a hub borne by said lever-ends, a bushing borne by one of said plates and adapted to support therein an adjacent portion of said hub, and a projecting lug borne by the adjacent plate and adapted to receive an adjacent portion of said hub thereon.

4. The combination, with a seat-frame comprising opposite plates bearing longitudinally curved flanges extending lengthwise of said plates, of shifting rockers slidably mounted on said flanges, a seat-bottom adapted to be borne by said rockers, and means adapted for mounting said seat-bottom on said rockers in hinged relation thereto, said means having hinged joints adjacent each end thereof and being adapted for permitting said seat-bottom to be folded upwardly from either side-edge on its opposite side-edge.

5. The combination, with a seat-frame comprising opposite plates bearing longitudinally curved flanges extending lengthwise of said plates, of shifting rockers slidably mounted on said flanges, a seat-bottom adapted to be borne by said rockers, and means adapted for mounting said seat in hinged relation to said rockers, said means having hinged opposite end-portions, one of said end-portions being secured to an adjacent portion of a rocker and the other end-portion being secured to an adjacent portion of said seat-bottom, said means being adapted for permitting said seat-bottom to be folded upwardly from either side-edge on the opposite side-edge and dropped from folded to normal position.

6. The combination, with a seat-frame comprising opposite plates bearing longitudinally curved flanges extending lengthwise of said plates, of shifting rockers slidably mounted on said flanges, a seat-bottom adapted to be borne by said rockers, means adapted for mounting said seat-bottom on said rockers in hinged relation therewith for permitting said seat-bottom to be folded upwardly on either side-edge and swung from folded to normal position, and members borne by said rockers and extending upwardly therefrom through openings borne by said hinged means, there being sockets formed in the underside of said seat-bottom and adapted to receive said members therein to facilitate adjusting said seat-bottom in its proper place when said seat-bottom is let down from folded to normal position on said rockers.

In testimony whereof I hereunto affix my signature.

BERNARD SCHECHTER.

Copies of this patent may be obtained for five cents each, by addressing the "Commissioner of Patents, Washington, D. C."